United States Patent [19]

Li et al.

[11] Patent Number: 5,013,446

[45] Date of Patent: May 7, 1991

[54] CHROMATOGRAPHIC GEL CONTACTOR AND PROCESS

[75] Inventors: Yao-Tzu Li, Lincoln, Mass.; Brad Yundt, Nashua, N.H.

[73] Assignee: Y. T. Li Engineering, Inc., Acton, Mass.

[21] Appl. No.: 514,097

[22] Filed: Apr. 25, 1990

Related U.S. Application Data

[63] Continuation-in-part of Ser. No. 388,248, Aug. 1, 1989.

[51] Int. Cl.⁵ .................. B01D 15/04; B01D 15/08
[52] U.S. Cl. .................................. 210/635; 210/656; 210/661; 210/198.2; 210/266; 530/413; 530/417; 435/803
[58] Field of Search ............... 210/198.2, 266, 321.63, 210/321.68, 327, 391, 413, 415, 383–385, 394, 396, 397, 414, 360.1, 359, 402, 403, 635, 656, 657, 661; 55/294, 300, 304; 530/413, 417; 435/803; 422/211, 212, 227

[56] References Cited

U.S. PATENT DOCUMENTS

| | | | |
|---|---|---|---|
| 4,618,399 | 10/1986 | Li | 159/6.2 |
| 4,713,176 | 12/1987 | Schoendorfer | 210/645 |
| 4,762,592 | 8/1988 | Li | 202/172 |
| 4,808,307 | 2/1989 | Fischel et al. | 210/321.68 |
| 4,871,462 | 10/1989 | Fischel et al. | 210/651 |
| 4,876,013 | 10/1989 | Shmidt et al. | 210/650 |
| 4,931,180 | 6/1990 | Darchambeau | 210/414 |

Primary Examiner—Robert A. Dawson
Assistant Examiner—Matthew O. Savage
Attorney, Agent, or Firm—Wolf, Greenfield & Sacks

[57] ABSTRACT

A gel contactor receives a fluid media produced in a bio-reactor and containing a product to be extracted, cells and other particles. The gel contactor has a cylindrical container with a cylindrical filter mounted inside the container. A freely rotatable wiper blade sweeps the upstream side of the filter in a closely spaced relationship. The container holds a supply of beads of an absorptive chromatography media such as an ion-exchange or affinity type gel, that selectively bond to the product. An orbital drive causes the blade, process fluid and gel to revolve. The rotation of the blade depolarizes the filter and circulates the process fluid process fluid and gel within the container so that they are well mixed, with substantially no dead spots. After mixing and filtration an elution buffer solution strips the product from the gel. There are no rotary seals connecting to the container. The orbital drive preferably has a variable radius, but may have a fixed radius when combined with start up techniques of the present invention such as introducing a small void volume in the container.

23 Claims, 5 Drawing Sheets

CHROMATOGRAPHIC GEL CONTACTOR AND PROCESS

REFERENCE TO RELATED APPLICATIONS

This application is a continuation-in-part of U.S. patent application Ser. No. 388,248 filed on Aug. 1, 1989.

BACKGROUND OF THE INVENTION

This invention relates in general to separation processes and apparatus. More specifically, it relates to a chromatographic gel contactor and a related method for recovering a product from a process fluid produced in a bio-reactor.

In certain biotech applications a product such as a protein or enzyme is produced by cells in a bio-reactor. The cells are immersed in a process fluid and the product is released into the fluid. While the use of naturally occurring or biologically engineered cells to produce a specific product is a well known commercial technique, difficulties in separating the product from the process fluid and undesired material carried by the fluid "downstream" of the bio-reactor significantly raise the cost of manufacturing the product. This cost of downstream processing limits the utilization of this approach in the manufacture of biological products, as compared to artificial, chemical production of the products.

Conventional downstream processing uses packed column chromatographic gel technology almost exclusively. Prefiltering of the fluid media is both extensive and necessary in order to remove suspended solids such as mammalian cells or precipitated proteins which ca clog the packed gel and interfere with the recovery of the product. In short, packed column technology requires that the medium carry the product be highly filtered before it reaches the packed column. In packed column technology it is also necessary to control the feed chemistry to obtain the optimal efficiency of binding between the product and the gel beads of the ion-exchange or affinity resin used in the contactor. Solutions to optimize the conditions for bonding the product to the gel are mixed with the feed in special tanks external to the packed column and the mixture then fed to the packed column, typically in a plug flow.

Another significant consideration is that the entire downstream processing should preferably be maintained in an aseptic condition. This filtration is not a sterile step because the filter membrane cannot be steam sterilized. Therefore, to prevent biological organisms that may grow on the filter from traveling back to and contaminating the bio-reactor, it is necessary to use a large tank that can hold the entire batch of the liquid being downstream processed. This harvest tank must be sterilized, and the tank itself is costly. A particular problem is that while cells are held in this tank, and when they are pumped through the filtration system, they tend to die or burst and release DNA into the process fluid. This is of particular concern if the cells producing the product are the result of recombinant DNA technology. Recombinant DNA must be thoroughly removed from the product to meet the standards of the U.S. Food and Drug Administration (FDA). Burst cells also release protein contaminants, including proteases which may inactivate the product.

Another consideration in downstream processing is that gels can have a significant cost. An inexpensive gel costs $200/liter and more expensive, but not uncommon, gels cost $10,000/liter, and up to $100,000/liter.

With packed column technology, there is no mechanical attrition of the gel and the gel can be used and reused for long periods of time. Therefore, while mechanical stirring arrangements are known, such as a stirred system manufactured by Pharmacia, heretofore there has been concern over loss of gel due to the mechanical impact and stress on the gel caused by the stirring. In addition, the Pharmacia stir contactor 1) is not continuous feed—it operates on a batch mode with the gel settling after stirring for a packed column like processing once settled—and 2) there is no control against the gel and other particulates clogging the filter if the unit were operated with continuous feed.

Current packed column chromatographic techniques typically involve the introduction of "plugs" of fluids through the gel, such as elution buffer solutions to strip the product from the gel, wash and rinse solutions, and fluids to adjust the pH. In plug flow, ideally the solution is introduced gently and advances through the column uniformly, albeit at a comparatively slow rate, e.g. 80 to 300 cm/hr. The speed of the solution through the column depends on the binding kinetics (the strength and speed of the reaction between the product and the gel) and the hydraulics of the packed column. In a conventional packed column these two issues are interrelated and they together determine the production speed of the column. To increase the production capabilities, commercial units have assumed very large diameters resulting in a "pancake" configuration. There are difficulties in producing plug flow characteristics across this large diameter unit and such devices are inherently not compact. And as noted above, the introduction of these conditioning fluids has typically required a special tank and mixer with associated conduits, valving, and other controls. Such arrangements increase the cost of the apparatus and the cost of the downstream processing generally.

In biotech applications, filtration systems should minimize damage to the product, gel, and cells, and should operate at a commercially viable rate. A significant problem is the piling up of particles in front of the filter, a phenomenon known as polarization. A common solution to this problem is to use a cross flow that sweeps the particles away. This technique is common in spiral wound or hollow fiber filters. However, pumps normally used in such systems to maintain high cross-flow velocities have the drawback of breaking open cells, thereby releasing DNA. They also may require rotary seals which provide a path of entry for bacteria into the processing system. Another approach involves a cylindrical-shaped filter rotating inside a fixed mating cylinder where a set of ring-shaped vortices, known as Taylor vortices, will be induced in the gap between the filter and the stationary cylinder to provide the mechanism of generating the stirring motion of the fluid to clear up the polarization. WFI seals are known and can provide a high level of protection, but they add to the cost of the system and for the requisite degree of protection against bacterial invasion, a holding tank must nevertheless be used. Direct drive rotary filters, utilizing Taylor vortices for anti polarization effect, are marketed by the Membrex company in the United States and by Sulzer Bros. Ltd. in Switzerland. The Membrex system involves the use of an inward flowing rotary filter cartridge driven to rotate by a magnetic drive coupling to avoid one rotary seal. However, the flow passage of the filtrant from the inside volume of the container still must be contained by a rotary seal to have a total sealed system.

A rotary filter can sustain much higher flow rate per unit area then the cross flow types. However, in either the propeller stirrer types, or the rotating cylinder types of filters, a rotary motion is involved with the need of some form of rotary seal which is objectional for biotech applications.

Another drawback of rotary agitated filtration equipment is the progressive reduction of the surface/volume ratio as the size of the equipment is increased.

It is therefore a principal object of this invention to provide an apparatus and a process for selectively recovering a biological product from a process fluid which may contain cells and other particulate matter with a high degree of efficiency and a comparatively short residence time.

Another principal object of the invention is to provide an apparatus that filters particulate matter from the process fluid, retains gel beads, and provides a thorough mixing of the process fluid and the gel with a minimum of attrition to the gel beads.

Another principal object is to provide a system with the foregoing advantage that processes the fluid aseptically and has no rotary seals or other like points of entry of biological contaminants.

Another principal object is to operate within the sterile envelope which surrounds the bio reactor to avoid using a containment vessel to protect against back contamination to the bio-reactor.

A further object is to decouple the binding kinetics from the packed column hydraulics to allow more economical contactor shapes.

A still further object is to provide an apparatus and method with the foregoing advantages with significant capital and operating cost advantages over conventional packed column technology, both in terms of the apparatus required its sterilization and operation, and the labor required in pretreatment of the process fluid.

A further object is to avoid contaminating the feed fluid with DNA or proteins by avoiding equipment that tends to lyse the cells.

Another object is to provide an apparatus which may be readily scaled in size without significant cost or performance disadvantages.

Another object is to provide an apparatus and method which a facilitates rapid change in the chemistry of the product recovery process without special tanks and mixing apparatus.

A further object is to provide an apparatus and a method with the foregoing advantages which can utilize a standard laboratory shaker table as a principal drive to react small volumes of fluids.

SUMMARY OF THE INVENTION

A chromatographic gel contactor receives a stream of process fluid from a bio reactor via an inlet. The process fluid contains cells, a product to be recovered, and other particles suspended in the process fluid. A filter, preferably one of cylindrical configuration, is mounted within a container of the contactor. A freely revolving blade or blade assembly is also mounted within the container with an edge of the blade closely spaced from the side of the filter open to the inlet. An orbital drive causes the container to move in a small horizontal circle; inertial coupling causes the blade, or blades, the process fluid, and a supply of gel beads held in the container to revolve. The blade depolarizes the filter an circulates the process fluid and gel within the container to produce a fluid-solid suspension that can be characterized as "well-mixed", with substantially no dead spots. The container has an outlet for filtrate—fluid carrying cells and small particulates—adjacent the side of the filter opposite the inlet. The container also has at least one outlet, preferably at its lower end, for removal of an eluant carrying product bound to the gel beads during the mixing and then stripped by an elution buffer solution.

In the preferred form, the container has an upper filter section defined by a cylindrical filter such as a sleeve of monofilament nylon screen stretched inside a porous, rigid tube and end clamped. The filter can also be a single or multiple layers of stainless steel mesh. In either case the screen size is closer to retain gel beads while passing cells. A lower section of the container is for eluant removal. A middle section is for mixing. An elution filter preferably extends across the bottom of the container between the gel beads and the outlet for the eluant. The container also includes an inlet for an elution buffer in its side wall. In a preferred form, the elution buffer solution is fed through the filtrate collection chamber.

The orbital drive is preferably of the variable radius type and able to accommodate multiple containers which can be operated in tandem to provide a substantially continuously product recovery from the process fluid with a high feed rate and a comparatively low gel attrition. For processing small volumes for experimental purposes, the orbital drive can be a standard laboratory shaker table. A variety of start up techniques to accept the fixed radius of the orbital motion of the shaker table fall within the scope of the present invention.

The container preferably has no rotary seals to introduce rotary power to stirring members or to accommodate the revolving movement of the container with respect to inlets or outlets. The system requires no breach of the sterile envelope for filtration and maintains an aseptic condition reliably once in operation.

These and other features and other objects of the present invention will be more fully understood from the following detailed description of the preferred embodiments which should be read in light of the accompanying drawings.

DETAILED DESCRIPTION OF THE PREFERRED EMBODIMENTS

Figure 1A:
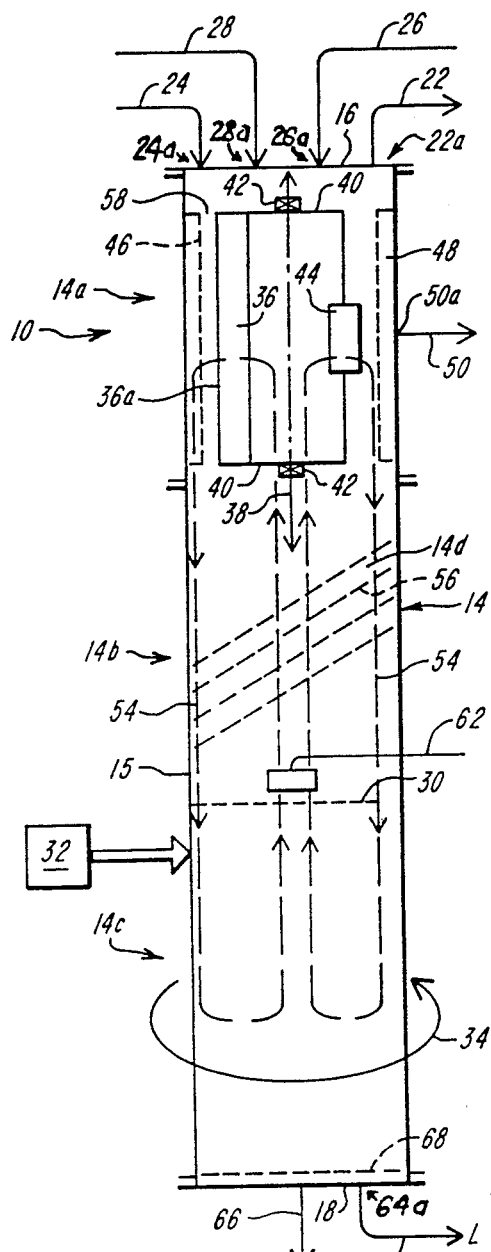
FIG. 1A is a simplified view in vertical section of a prototype four liter embodiment of a chromatographic gel contactor constructed according to the present invention.
Figure 1B:
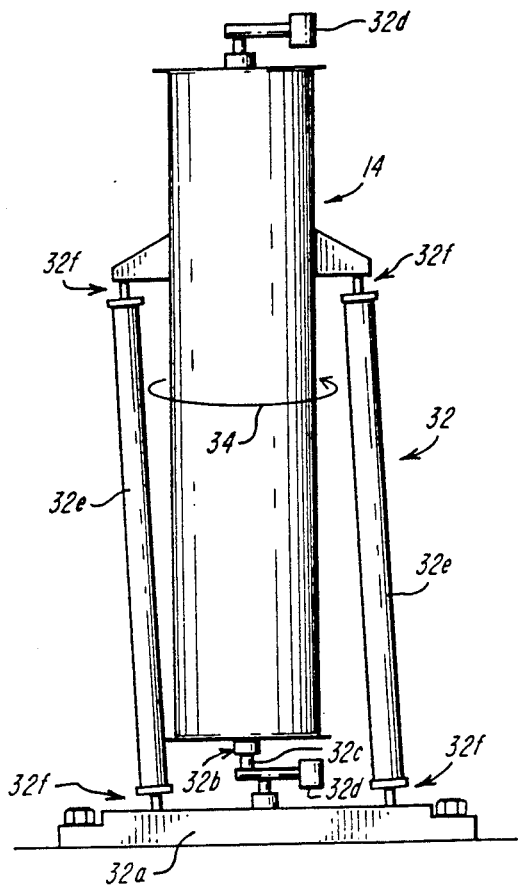
FIG. 1B is a view in side elevation of the gel contactor shown in FIG. 1 and a variable radius orbital drive.

FIGS. 1A and 1B illustrate in a simplified form an orbital chromatographic gel contactor 10 of the present invention. A stream of process fluid produced in a bio reactor, but which may be held in a feed tank 12 (FIG. 3) after some conditioning process steps such as ph adjustment, or dilution, contains a product to be recovered. In a principal application, the product is a protein or enzyme produced by mammalian cells. The product can also be produced in bacteria which need to be burst to release the product, leaving cellular material in the process fluid. The process fluid will also usually include other suspended particulate matter such as precipitated proteins which can be agglomerations of many large proteins which will readily clog filters. A concern in protein production using mammalian cells is that burst cells will release DNA into the process fluid which may be recombinant DNA which needs to be specially handled to meet FDA requirements.

Figure 3:
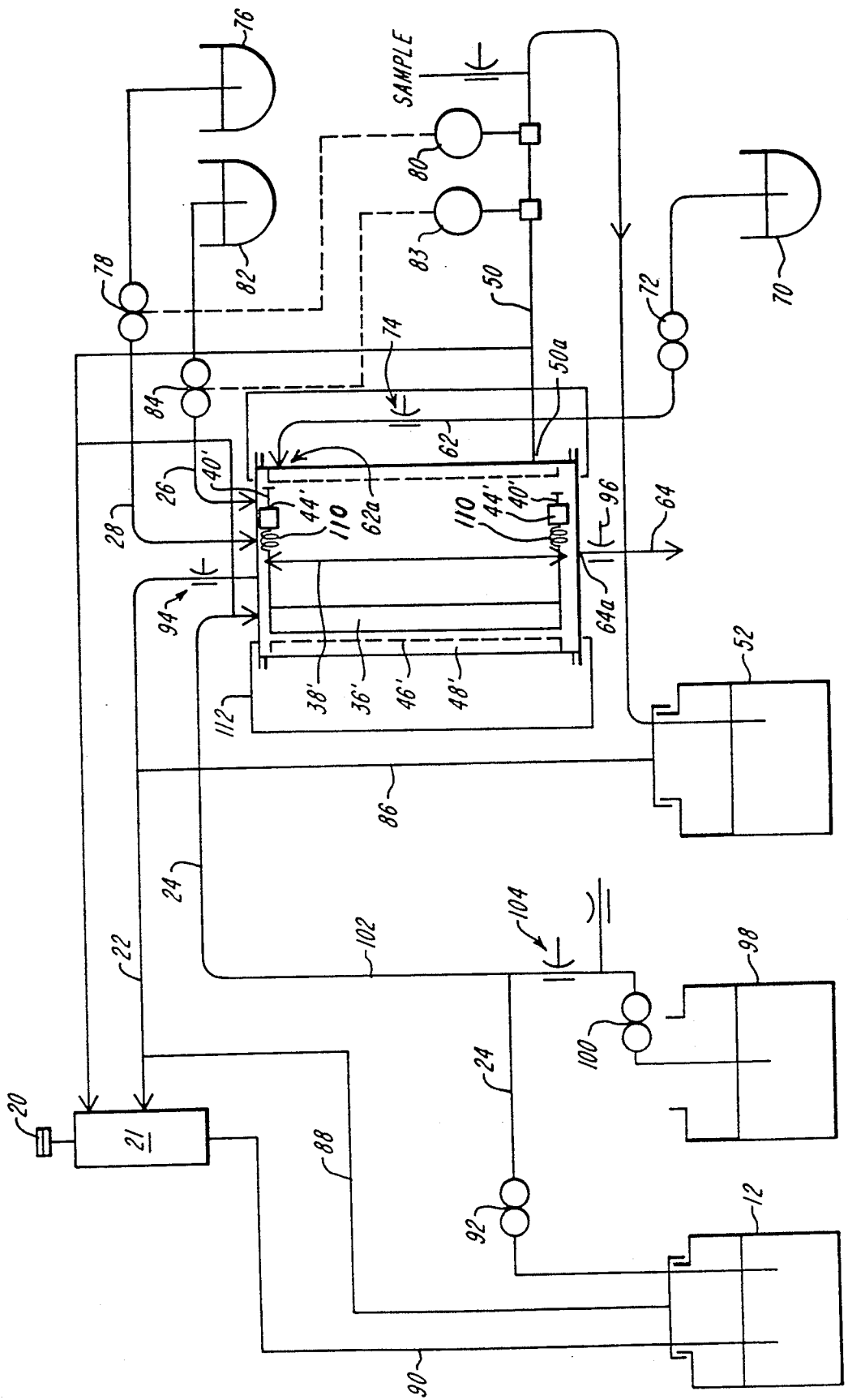
FIG. 3 is a simplified schematic view of a downstream processing system organized about a gel contactor of the present invention as shown in FIG. 2.

The contactor has a container or tank 14 with a cylindrical side wall 15, upper and lower end walls 16 and 18, respectively, and various inlets and outlets to introduce or remove fluids from the container. As best seen in FIG. 3, the tank 14 is vented via line 22 through a sterile filter 20 mounted on and venting an overflow tank 21. Inlets in the upper end wall 16 include inlets for line 24 carrying the product-rich process fluid from the tank 12, line 26 carrying a condition component A, and line 28 carrying a conditioning component B, each designed for use in creating conditions optimal to the operation of a supply 30 of gel beads of the affinity or ion-exchange type in selectively binding. The gel beads partially fill the container, typically occupying about 10 to 75 percent of its interior volume 14d, measured volume to volume (v/v). The beads are costly and delicate; they readily fracture or wear when subjected to mechanical stresses.

A principal objective of the present invention is to mix the gel beads, or more generally a granular or particulate substance, with the process fluid efficiently and thoroughly, but with a minimum of mechanical impact and sheer stress which wears the gel and can break cells. Such mixing provides an essentially complete product recovery—binding of the product carried in the process fluid to the gel—with shorter residence time and at a higher feed velocity than would ordinarily be possible using conventional packed column or known stirred cell technology. This is because the present invention decouples the binding kinetics from the packed bed fluid hydraulics. For use with ion exchange type gels, the present invention can obtain residence times of a few minutes, depending on the type of gel and product to be bound, the degree of mixing, the feed rate and other factors well known to those skilled in the art. For use with affinity type gels, longer residence times, e.g. 30 minutes, are typical. However, regardless of the binding kinetics during the mixing and filtering, once the mixing is stopped and the gel settles, stripping of the product (or impurities) can proceed using an elution buffer solution.

This mixing is driven by an orbital drive 32 of the general type described in one of the present applicant's U.S. Pat. No. 4,762,592, the disclosure of which is incorporated herein by reference. The drive 32 propels the tank 14 with respect to a frame of reference 32a, e.g. the ground, a base, or a table, in an orbital or revolving motion, preferably in a horizontal circular path 34. In the aforementioned patent, this motion is developed by an electric motor 32b which rotates a shaft 32c that eccentrically mounts a pair of counterweights 32d,32d which orbit with the tank about a common vertical axis. The tank is supported by a set of exterior struts 32e which are resiliently coupled at 32f between the reference member and the tank. The couplings flex to allow the orbiting movement of the tank with their spring force resisting tilting of the system while allowing the tank to revolve within an acceptable range of motion, and with an inherent natural frequency in the spring-mass system of the tank and resilient couplings. This type of orbital drive allows a variable radius of orbit for the tank. Initially the radius is large, but becomes smaller as the speed of the drive reaches its selected maximum value. This variation of the radius is helpful in coupling the orbital motion of the drive and the container to the movable components within the container, such as a blade 36 and the fluid-solid mass of the process fluid and gel filling the container. This variation in the radius facilitates the operation of the orbital drive on start up.

The blade 36 is mounted within the tank 14 to rotate freely about a vertical axis 38, which is preferably coincident with the centerline of the tank. The blade is mounted in any conventional manner consistent with good manufacturing practices (GMP) for aseptic operation of a gel contactor. Preferably the blade is mounted between a pair of crossbars 40,40 that pivot in bearings 42,42. A counterweight 44, preferably one having a significantly greater mass than the blade, is also mounted on or between the crossbars on the side of the axis of rotation opposite the blade. The orbital drive causes the counterweight to orbit, which thereby rotates the blade in a circular path in a filter section 14a of the tank, preferably located adjacent the upper end wall 16. This motion rotates the entrained fluid and suspended particles whether (solids, liquids or gases) adjacent the blade to rotate this fluid particle mass within the container.

In the preferred embodiment the fluid and particles in part flowing radially outwardly in the filter section 14a encounter a filter 46 mounted inside the tank 14. The filter has pores sized to block the passage of particles larger than a predetermined size. The filtrate includes cells, precipitated proteins, worn gel and other small particles such as cell or gel fragments. The filter retains gel beads that are not badly worn or fractured. The filtrate enters an annular chamber 48 that is sealed at top and bottom from the interior of the tank. The chamber 48 has an outlet 50a that is fed by line 50 to a conditioned media flow-through tank 52 (FIG. 3).

After start up, the rotation of the blade 36 eventually rotates the entire mass of liquid and suspended particles held in and filling the tank 14. However, the viscous drag on the rotating fluid results in a somewhat lower centrifugal force at the lower end of the tank, a mid section 14b in FIG. 1A and a lowermost elution section 14c, than at the upper end, filter section 14a. The resulting vertical pressure differential produces a circulation or flow pattern 54 of the fluid and suspended particles and gel that is radially outward at the filter section, downward along the outer tank wall of the tank through the mixing and elution sections, radially inward adjacent the bottom wall 18, and generally upward along the centerline of the tank. This flow pattern reaches throughout the interior volume 14d of the tank and promotes, in combination with the turbulence produced by the movement of the blade 36, a highly effective mixing of the materials within the tank with substantially no dead spots. While a straightforward cylindrical tank made of stainless steel or other structural material suitable for the particular application is shown, the tank may include fluid guiding members such as baffles or rounded interior corners to enhance the mixing action. In particular, a fixed spiral baffle 56, shown in phantom in FIG. 1A, can be used to promote the mixing action.

By way of illustration but not of limitation, for a tank 14 of the type shown in FIG. 1A, having a diameter of four inches, a height of twenty four inches, and an interior volume 14d of four liters, a standard conditioned process fluid from a bio-reactor can be completely processed, with substantially all of its product bound to ion exchange type gel beads, with a residence time in the gel contactor for the mixing and binding of at most 5–7 minutes. With mixing enhancement features such as a spiral baffle, the residence time for certain applications can approach 1 minute. The comparatively short residence times allow high equivalent feed velocities, e.g. over 1,000 cm per hour for a single gel contactor, as compared to standard packed column technology, which uses "pancake" columns with large diameters to accommodate comparatively slow axial progression of the elution buffer solution and other liquids axially through the packed gel in a plug flow. Moreover, as will be noted in more detail below, the present invention is readily scaled up in size to increase its production capacity, or scaled down for laboratory use with no significant operational disadvantages and a reasonable costs commensurate with the changes in the production of the device.

A principal feature of the present invention is the inclusion of the filter 46 within the gel contactor and the use of the rotating blade to control polarization. As noted above, heretofore it has been found necessary to remove the process fluid from the sterile envelope of the bio reactor, and therefore to have a large sterizable containment vessel, to perform elaborate filtration prior to passing the process fluid through a packed column gel contactor. When properly spaced from the upstream side of the filter 46, the rotating blade can maintain a high flux rate through the filter through repeated cycles of operation of the gel contactor. The flux rate is many times greater than would be possible without depolarization. A preferred value for the clearance 58 between the outer edge 36a of the blade and the inner surface of the filter is about 0.10 inch (about 3 mm) for typical biotech applications. A preferred range is about 0.05 to about 0.25 inch. At closer spacings, damage to the beads, or even to the filter itself, is more likely to occur. At wider spacings, there is a decline in the ability of the blade to depolarize. Also, 0.10 inch is a comfortable spacing given normal manufacturing tolerances to ensure that the blade-filter spacing will be adequate despite small variations in the dimensions, location and geometrical uniformity of the blade and filter.

The description given above is for a flat blade. A hydrofoil shaped blade, e.g. round or elliptical in cross-section, may show some improvement in performance and with different characteristics including an optimum trade off between filter performance and gel destruction.

Figure 2:
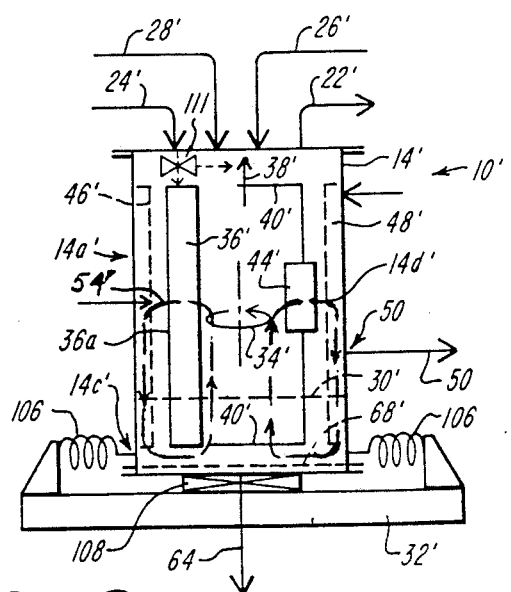
FIG. 2 is a view corresponding to FIG. 1 of a prototype one liter embodiment of a chromatographic gel contactor according to the present invention mounted on a shaker table with a spring mass start up system.

The filter 46 is preferably cylindrical, as shown in FIGS. 1–3 It may be formed by wetting and stretching lengthwise a tubular sleeve of monofilament nylon with an appropriate pore size inside a rigid, porous tube made of a material such as stainless steel or plastic and having a large number of perforations in its wall. For the biotech applications discussed herein the nylon preferably has pores designed to retain spherical particles with a 25 micron diameter. A suitable nylon material is available from U.S. Strainrite of Lewiston, Maine. The ends of the nylon screen are folded over the outer ends of the rigid support tubes and clamped using any convenient means such a removable mechanical clamp, an adhesive, or otherwise. It is also contemplated that the filter can be a multilayer, or even a single layer, unit of a material such as stainless steel or a plastic which has a high density of small holes of uniform diameter formed in its side walls to provide the necessary filtering action while providing a high flux rate. Stainless steel has the advantage over nylon that it can be steam sterilized.

The blade 36 has been described as a single blade mounted with a diametrically opposed counterweight 44. However, it will be understood that a wide variety of other arrangements can be used to perform the depolarization and fluid circulation mixing functions of the blade. For example, additional blades may be added provided that they are balanced or combined with weights so they will inertially couple to, and be rotated by, the orbital motion of the tank 14 as a whole. One blade, however, is preferred. In addition to its inherent eccentric balance, it produces less mechanical stress due to impacts and shear stress on the gel beads than multiple blades, and therefore reduces gel attrition. For the biotech applications described herein, using a cylindrical filter with a diameter of 3.5 inches and a height of 5.5 inches, single blades rotating at about 200 rpm can maintain a feed rate of 1,000 to 1,400 ml/min at commercially acceptable attrition rates.

It is also possible to depolarize using a rotating cylinder that is spaced closely from the filter so that Taylor vortices in the annular space between the cylinder and the filter sweep the filter to unclog it. This arrangement, however, generally presence of the cylinder complicates the creation of a circulation of the type indicated by the arrows 54 since the cylinder blocks a direct radial flow from the interior of the tank to the filter.

The tank 14 has an outlet 22a connected to the vent line 22, an inlet 62a connected to an elution buffer solution feed line 62, an eluant outlet 64a connected to an eluant outlet conduit 64 and, at least in the FIG. 1A embodiment, a main drain 66 for emptying the tank 14. All of these inlets and outlets and the inlets 24a, 26a, 28a, are connected between the associated lines and the tank 14 and without any rotary seal. The connection must be sufficiently flexible to accommodate the orbital motion of the tank without rupturing or inhibiting the motion, as by the use of short rigid couplings and flexible conduits, or by introducing flexibility into the couplings themselves. This is important in maintaining a reliably aseptic environment within the tank since any rotary seal is a potential path for the entrance of biological contaminants into the tank.

The elution buffer solution inlet is located in the side wall 15 of the tank at a height such that it is above the gel beads when they have settled, after the orbital motion and the mixing are stopped. The elution buffer can be introduced through a spray nozzle, porous plug or other known technique as shown in FIG. 1A. In the FIG. 1A embodiment, the elution buffer inlet is between the mixing and elution sections. In the smaller, one liter capacity tank shown in FIG. 2, the elution buffer inlet is at the upper end of the filtrate chamber 48. The elution buffer backwashes radially inwardly through the filter to a point above or near the top of the settled gel. This method of introducing the elution buffer is the present invention, and is preferred. The elution buffer solution follows a flow path of least resistance from the filtrate chamber 48, 48' and flows through the chamber and along the filter to a point just above the settled gel beads. This action is gentle, reliable, and allows subsequent plug flow when conduit 64 is opened. The elution buffer moves downwardly through the settled gel in such a plug flow, strips all of the product from the gel beads, and puts it in solution with the eluant which passes through an elution filter 68 positioned across the bottom of the tank and exits the gel contactor 10 via the outlet 64a and conduit 64. The product is then recovered from the eluant using conventional chemical processing. The gel beads are then washed, rinsed and regenerated for a following cycle of operation. The elution filter 68 is also preferably formed from the same nylon material as the filter 46, 46' supported on a set of slotted circular ribs of the type that are conventional in packed column technology.

As shown in FIG. 3, the elution buffer solution is held in a tank 70 and fed through line 62 by pump 72 controlled by valve 74. Component A and B are any of a variety of known liquids or solutions used in conditioning the feed. Component A is held in tank 76 and fed by pump 78 under the control of a probe 80 in the filtrate outlet line 50. Component B held in tank 82 is fed by pump 84 under the control of a probe 83 in the filtrate outlet line 50. A conditioned media flow-through tank 52 for the filtrate is vented via line 86 connecting to the overflow tank 21. Line 88 vents the process fluid feed tank 12 to the overflow tank 21. A drain line 90 feeds from the overflow tank to the feed tank 12. A pump 92 propels the process fluid from the tank 12 via the line 24 to the gel contactor 10. Valves 94 and 96 control the vent line 22 and the eluant outlet line 64, respectively. A tank 98 holds a regeneration/wash solution for the gel beads which is fed by pump 100 via line 102 controlled by valve 104. The regeneration/wash solution is added to the top of the tank, after withdrawing the eluant and closing valve 96. After regeneration the regeneration fluid is drained and a fresh supply of the process fluid from tank 12 fills the tank 14.

The FIG. 2 small volume gel contactor 10' is well suited to experimental applications in a laboratory. Like parts in FIG. 2 are identified with the same reference numbers as in FIG. 1, except they are primed. The major difference between the FIG. 1 and FIG. 2 embodiments is that in the FIG. 2 embodiment the filter 46' and blade 36' extend vertically over most of the tank. There is no mid section of the contactor identified primarily as a mixing section as in FIG. 1A. Rather, the mixing occurs throughout the interior volume of the tank, caused by the motion of the blade 36' in response to the orbital motion and the flow circulation pattern 54'. The gel contactor 10', as with the gel contactor 10 of FIG. 1A, can be characterized as "well mixed."

For laboratory use, the orbital drive 32' that propels the gel contactor 10' in the orbital motion 34 may be a standard laboratory shaker table. One difficulty with using a shaker table is that, in contrast to the orbital drive described in U.S. Pat. No. 4,762,592, is that its motion has a fixed radius. On start up this makes it very difficult, if not impossible, to synchronize the movement of the blade 36' and fluid in the tank 14' with the drive on start up. This is due to the fact that the contactor is filled with the fluid (as opposed to prior applications of orbital drives by one of the present applicants where a fluid within an orbiting tube or container does not fill it). Also, gel can impede or totally block movement of the blade (as by the supply 30 of beads embedding the blade, or a portion of the blade). The present invention includes several solutions to this start up problem.

A first solution is to fill the tank 14', but to leave a small volume of sterile gas over the process fluid and gel mixture. Then, as the orbital motion is applied, the fluid is thrown by centrifugal force against the side wall with a void volume opposite it. The rotating fluid-gel mass is then eccentrically weighted. In this condition the orbital drive can propel the blade and bring it into synchronous motion with the orbital drive, typically within ten seconds after starting the drive.

Another solution, shown in FIG. 2, is to mount the tank 14' on the shaker table as part of a spring-mass system where the tank comprises the mass and a set of coil springs 106 resiliently secure the tank against horizontal movements. Ball bearings 108 or the like mounted between the shaker table and the tank allow the tank to move laterally in response to the motion of the shaker table restrained only by the springs. The springs introduce a variability in the radius which facilitates start up. The natural frequency of this spring-mass system is preferably low so that the speed of the shaker table will hit the natural frequency as the shaker table starts up and thereby facilitate an inertial coupling of the device and the movable masses of the fluid-gel-blade counterweight within the tank 14'.

Two mechanical solutions include, first, the simple expedient of tilting the tank to swing the weight 44' under the influence of gravity to "kick start" the system and, second, mounting the counterweight 44' (FIG. 3) to slide freely along the cross bar 40', or a comparable radially extending member, restrained by a coil spring 110 that draws the weight toward the axis of rotation in opposition to the centrifugal force produced by the revolving.

A further start up solution involves mounting an impeller 111 (shown in phantom in FIG. 2) within the tank such that as process fluid enters the tank 14' from the feed line 24', it strikes the impeller to produce a rotary motion which is mechanically coupled to rotate the blade. In any of these start up techniques, the weight 44,44' preferably carries a standard magnetic pick up so that it is possible to monitor the actual motion of the blade to confirm whether or not the blade, fluid and gel are in fact coupled, that is, moving in synchronization with the drive.

In operation, outlet valving is first closed and a conditioned media or process fluid flows into and fills—or in the void of the fixed radius void volume start up technique, substantially fills—the interior volume of the tank 14,14'. The orbital drive 32,32' propels the tank and its contents in a revolving or orbit like path of motion about a vertical axis. The blade 36,36' begins to rotate in response to the orbital motion. It depolarizes the filter 46,46', and circulates the fluid in the tank, setting up the circulation path 54,54' and producing a good mixing of the process fluid with the gel to bind most of the product to the gel in a relatively short time. The speed of the orbital drive for biotech applications of the type described hereinabove, is preferably about 200 rpm or less for the four liter contactor 10 described above. This rate has been found to produce a relatively low level of gel attrition, e.g. less than 1% over a 24 hour period using non-virgin gel, and generally decreasing levels of attrition during subsequent periods of operation. Rotation of the blades at 250 rpm and higher, for example, have demonstrated substantially higher levels of gel attrition. (Regardless of the speed of rotation, new or virgin gel demonstrates a significantly higher attrition rate than previously used gel.)

It is also within the scope of this invention to use a tank 14, 14' having a varying diameter to tailor the tank to the specific function being performed in the sections 14a, 14b and 14c. More specifically, the mixing and/or elution sections can have a larger diameter than the filter section to facilitate the mixing and to provide a larger volume of settled gel during elution for a given gel depth, and hence a faster elution of the settled gel.

After mixing for a sufficient time to bind the product, the feed is stopped and a wash solution added to purge the contactor of cells, media and unbound protein. The orbital drive may then be turned off to let the gel settle to the bottom of the tank, resting on the filter 68,68' in a packed bed. Wash solution is then drained from the contactor to a height just above the settled gel. Elution buffer solution is fed into the tank above the settled gel. When outlet line 64,64' is opened, the elution buffer solution moves downwardly through the gel bed, preferably in a plug flow, to strip the product from the gel and carry it out the tank via the outlet line 64,64'. A pump can be inserted in the outlet line 64,64' to control the progress of the plug flow. After the stripping is completed, the valve 96 is closed and regeneration solution is introduced to regenerate the gel for another cycle of operation.

A significant advantage of the present invention is that it is scaleable, that is, gel contactor volume and hence the capacity of the gel contactor can be easily increased or decreased. Furthermore, any of the orbital drives described herein can readily drive two or more tanks and their related conduits at the same time, or drive tanks with different internal working volumes, whether ones having a different diameter, height, or both. In particular, if two or more tanks are used, they can be operated in tandem so that the gel in one can be washed, eluted and regenerated while the gel in the other is recovering product from a batch of the process fluid. The orbital motion mixes the process fluid with the gel in one tank and the wash elution, and regeneration solution with the gel in the other tank. Note that this example requires elution to occur while orbital motion stirs the gel, increasing the volume of elution buffer needed. To avoid this restriction, two orbital systems can be used, each one carrying a gel contactor. This tandem arrangement allows a generally continuous processing of the output of a bioreactor or bioreactors. In particular, the good mixing and simultaneity of action ensures that there is a uniformity in the processing of the media, or process fluid. This consideration is important in ensuring that the product meets its specifications and to comply with requirements of the U.S. Food and Drug Administration for processing equipment of this type.

The present invention also is unusually conducive to temperature control. A heat exchange jacket 112 (FIG. 3) of any well known type can be fitted around the exterior of the tank 14,14' in a heat exchanging relationship. A cooling jacket is important in certain protein production applications where it is desirable to maintain a low temperature, e.g. 4° C., to minimize the destruction of the protein product being manufactured. Because the present invention mixes the contents of the tank, temperature control set by the jacket is readily conveyed throughout the contents of the tank. Alternatively, the comparatively fast processing times and flow rates of this invention in themselves reduce thermal inactivation of protein—e.g. as occurs when the process fluid is held for a long period of time, without oxygen, in a holding tank of prior art systems. The speed of the present system also allows a fair degree of temperature control by cooling the feed tank 12 and merely insulating the gel contactor itself.

Figure 4:
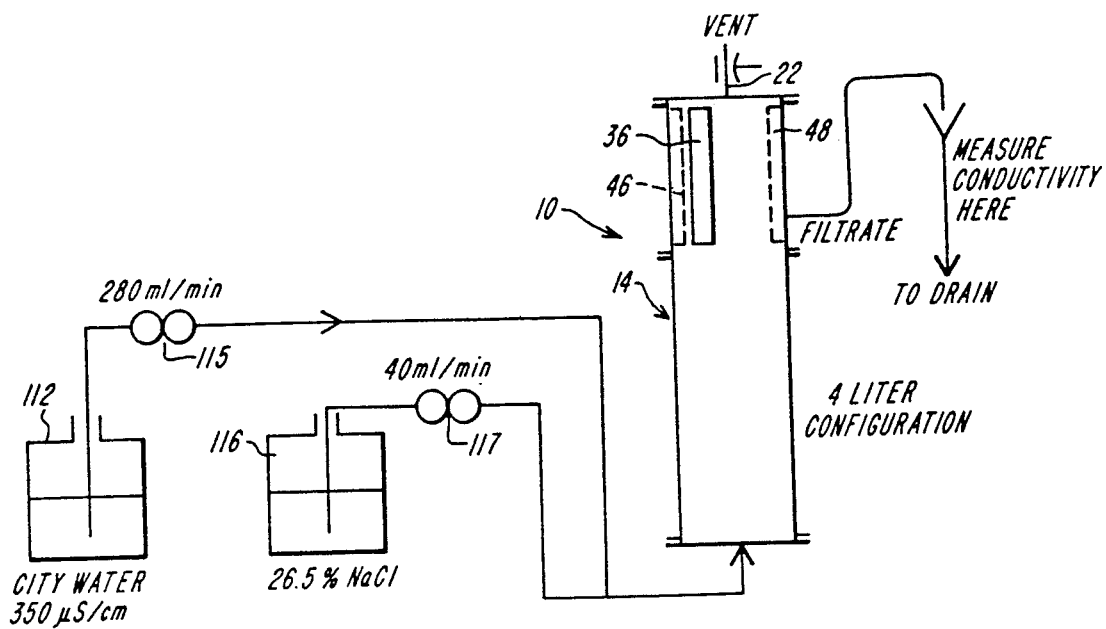
FIG. 4 is a schematic view of a test arrangement using the four liter gel contactor of FIG. 1.
Figure 5:
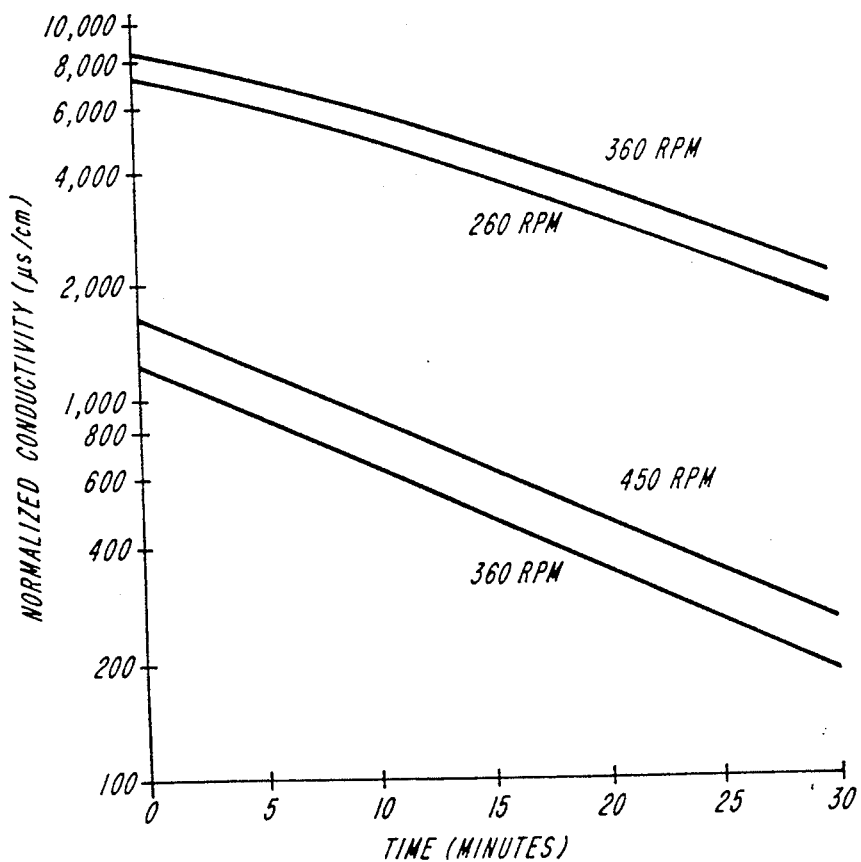
FIG. 5 is a graph of the conductivity of the solution mixed in the system shown in FIG. 4 at a low feed rate.

A central concern in using the stir type gel contactors 10,10' is that all of the product be treated uniformly, which in turn requires that the process fluid and gel be well mixed. To test the mixing characteristics of the present invention, the four liter contactor 10 was tested in the system shown in FIG. 4 by measuring the conductivity of the filtrate as function of time as city water from a supply 114 is fed by pump 115 to dilute an initially high sodium chloride concentration in the contactor established by pump 117 feeding a salt water solution from a supply 116 to the contactor. Ideally a semi log plot of concentration versus time will exhibit a monotonic exponential decay with a slope magnitude equal to the feed rate per system volume (the reciprocal of the residence time). A semi log graph of normalized conductivity as a function of time should also have monotonic exponential decay with the slope magnitude equal to the feed rate/system volume. This proved to be the case as shown in FIGS. 5–7.

Figure 6:
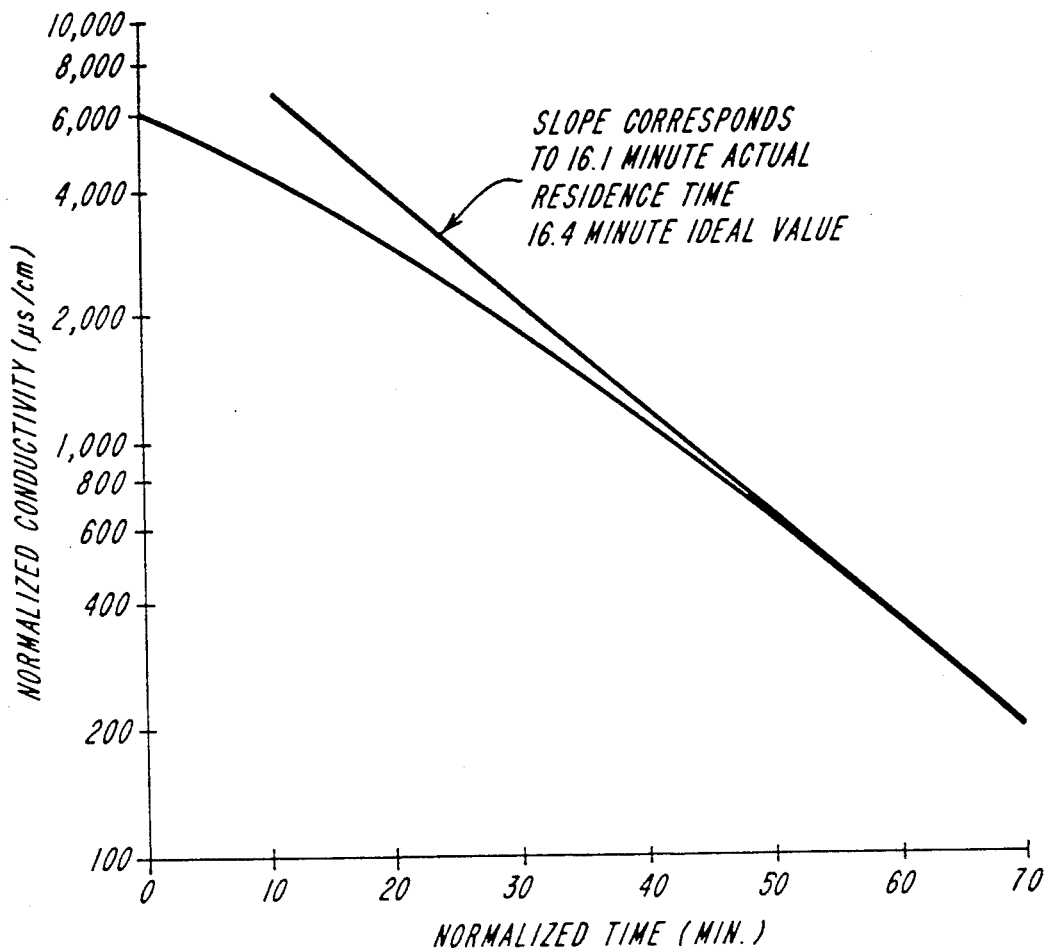
FIG. 6 is a graph corresponding to FIG. 5 for a low feed rate where the information of FIG. 5 for different conditions presented as a composite.
Figure 7:
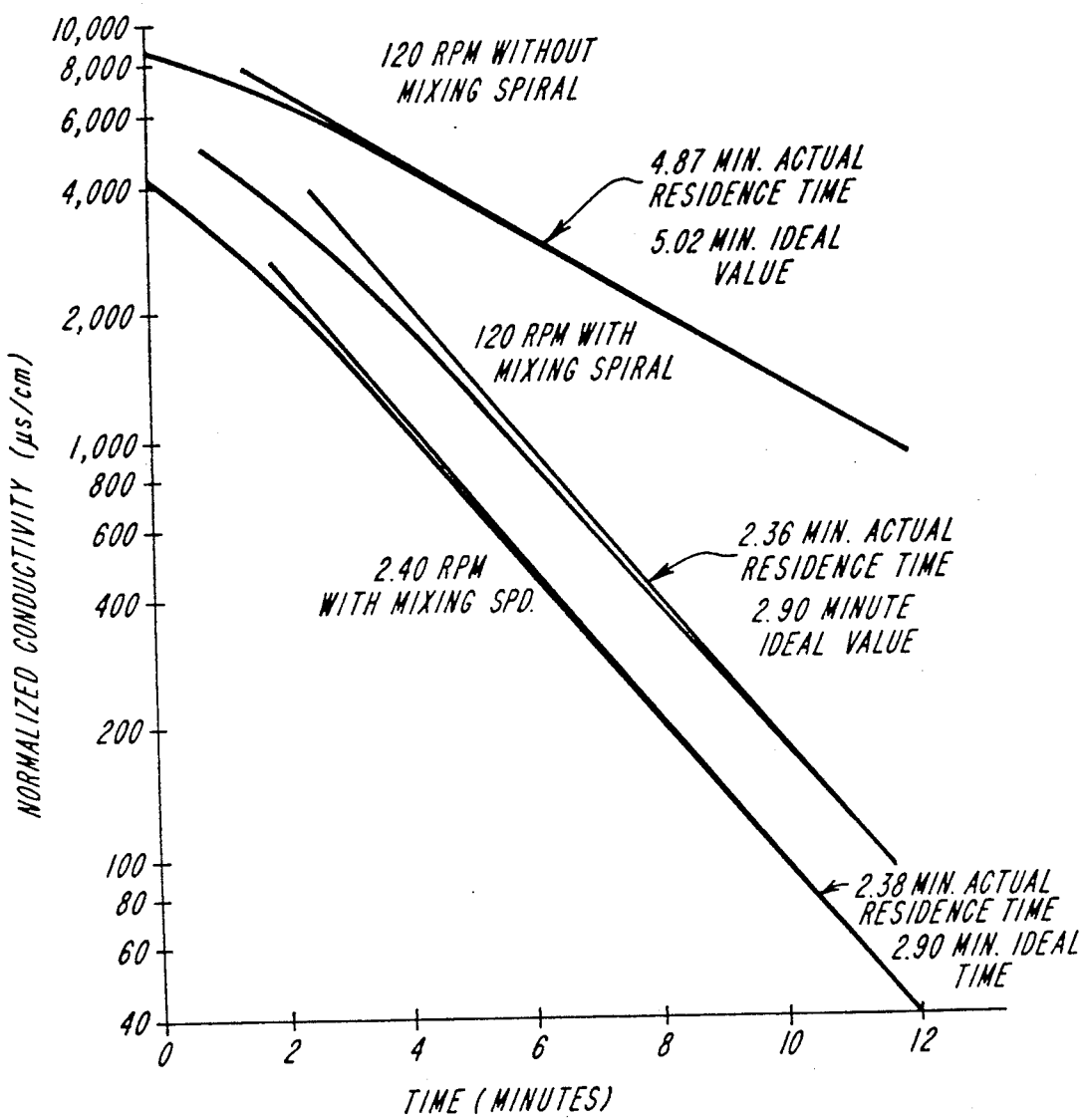
FIG. 7 is a graph corresponding to FIGS. 5 and 6 for a high feed rate.

At low feed rates (280 ml/min feed—16.4 minute residence time) with 27% v/v gel slurry, data from 260, 360 and 450 orbital rpm experiments all fell on the sam semi log composite curve as illustrated in FIG. 6. Raw data from each experiment were perfectly monotonic. To make meaningful exponential decay plots (FIG. 5), the conductivity of city water must be subtracted from the raw data. The normalized data from different experiments had different starting conductivities. By shifting the data horizontally to match starting conditions, the data then all fell on the same composite curve (FIG. 6). The composite curve was perfectly straight when conductivities were under 3000 $\mu$S/cm, but had a small negative curvature at higher values. The negative curvature resulted from nonlinearities in the concentration versus conductivity curve for sodium chloride. The slope in the straight portion of the curve suggested a residence time of 16.1 minutes, only 2% less than the ideal value. This means that the system is well mixed at this low feed rate.

At an intermediate feed rate (900 ml/min—5.02 minute residence time) with no gel in the system, normalized data at 120 rpm was monotonic. The actual residence time of 4.87 minutes was only 3% lower than the ideal value, indicating that good mixing occurred even without the use of internal baffles, spiral vanes or other mixing enhancers.

At high feed rates (1560 ml/min—2.9 minute residence time) with no gel in the system, normalized data from different orbital rpm was still monotonic (FIG. 7), but showed some departure from perfect mixing. At 240 rpm the actual residence time was 2.38 minutes, 18% less than the ideal value. However, these test results indicate that the present invention can obtain commercially acceptable performance which is substantially better than the performance of conventional packed column technology.

There have been described an orbital, stir-type gel contactor and process which produce a well mixed gel-process fluid suspension characterized by a short residence time and high feed rates while obtaining a substantially complete recovery of the product from the process fluid. The contactor of the present invention does not require expensive filtration prior to introducing the fluid to the contactor and can readily be maintained in an aseptic condition. The invention causes low gel attrition or loss and can be easily scaled up in size. It is also conducive to the rapid changes of the chemistry of the contactor without special tanks and stirrers. The invention is also readily adaptable to small volume processing using a standard laboratory shaker table as a drive.

While the invention has been described with respect to its preferred embodiments, various modifications and alterations will become apparent to those skilled in the art from the foregoing detailed description and the accompanying drawings. For example, while the invention has been described with respect to an orbital drive, it is possible to use a gel contactor with an in-built filter, rotating blade or cylinder depolarizer, and the other features of the present invention in combination with a direct drive or a magnetic drive. The direct drive, however, will require rotary seals and the magnetic drive may present cost or torque limitations for certain applications. Further, while the invention has been described principally with reference to a cylindrical filter, it is possible to use a flat filter and to orient the blade to sweep over it in the same manner as described above to depolarize the filter. However, a cylindrical filter offers a good surface/volume ratio, matches well the geometry of the tank, and is oriented to use the swirling fluid to promote the filtering and mixing. Also, it is possible to use a variety of internal baffles to guide the flow, enhance the mixing or achieve other objectives. Further, while the invention has been described with respect to biotech applications where gel beads bind a biological product and maintaining aseptic operating conditions is a concern, the invention can be used wherever it is intended to react a fluid carrying a suspended medium with a granular substance ("granular" being used to include powders and particulates, and even a liquid or a solution, but to exclude a large solid mass or masses that cannot be mixed). In particular the invention can be used for waste water treatment of difficult contaminants such as PCB and trichloroethane where effective mixing of a contaminated fluid with a reagent or in the presence of ultraviolet or other radiation is essential. For these applications, the term "product", as used herein, should be interpreted to include an impurity which is desired to be removed from the liquid feed. For waste treatment applications, rotary seals may be used to connect feed and outlet lines to the container, or for other purposes. Such modifications and variations are intended to fall within the scope of the appended claims.

What is claimed is:

1. Apparatus for processing a fluid carrying suspended particles with a granular substance that selectively removes a product from the fluid comprising a container having a fluid inlet, an outlet for a filtrate, a second outlet, said inlet and said outlets in fluid communication with the interior of said container, the interior volume of said container holding and being substantially filled with a supply of a granular substance capable of selectively removing a product from the a filter mounted within said container having an upstream surface in fluid communication with said inlet and a downstream surface in fluid communication with said filtered fluid outlet, said granular substance being located between said upstream surface and said fluid inlet and said fluid outlet, means mounted within said container and revolving freely over said upstream surface of said filter in a closely spaced relationship for controlling polarization of said filter, and means for driving said polarization control means in said revolving motion, said drive means and said rotating polarization control means circulating the fluid and the particles and said granular substance suspended in the fluid within said container to produce an effective mixing of said fluid and suspended material with said granular substance within said container with substantially no dead spots.

2. The apparatus of claim 1 wherein said driving means is an orbital drive that moves said container and said filter in a non-rotating orbit and wherein said polarization control means is eccentrically weighted to inertially couple to said orbital driving means.

3. The apparatus of claim 1 or 2 wherein said granular substance is beads of a gel that selectively binds the product, the suspended particles include cells and a biological product of the cells and said filter is constructed to block the passage of the beads therethrough while passing the cells.

4. The apparatus of claim 3 wherein said inlet and said outlets are in fluid communication with said container without rotary seals.

5. The apparatus of claim 1 or 2 wherein said filter is cylindrical and mounted adjacent the upper end of said container to define an annular outlet chamber between said downstream surface of said filter and said container that is in fluid communication with said filtrate outlet.

6. The apparatus of claim 5 wherein said polarization control means comprises a blade having an edge that is in said closely spaced relationship.

7. The apparatus of claim 6 wherein said polarization control means includes an eccentrically mounted weight that revolves with said blade to inertially couple said orbital drive means and said blade.

8. The apparatus of claim 1 or 2 wherein said suspended particles includes cells and biological products of those cells the granular substance comprises beads of a gel that selectively binds said product, and said closely spaced relationship is in the range of about 0.05 inch to 0.25 inch.

9. The apparatus of claim 3 wherein said container also includes an elution buffer inlet and said second outlet is located at the lower end of said container, and further comprising an elution filter mounted in said container near its lower end between said eluant buffer inlet and said second outlet.

10. The apparatus of claim 9 wherein said elution buffer inlet is in fluid communication with said downstream surface so that said buffer flows through said filter and above the granular substance when the orbital drive means is stopped and the granular substance has settled in said container onto said elution filter.

11. The apparatus of claim 2 wherein said orbital drive produces a horizontal and generally circular motion with a variable radius.

12. The apparatus of claim 2 wherein said orbital drive produces a horizontal and generally circular motion with a fixed radius.

13. The apparatus of claim 12 wherein said orbital drive comprises a shaker table.

14. The apparatus of claim 13 wherein said orbital drive means further comprises means for allowing said container to move freely over said shaker table, and means for resiliently restraining said container on said table, wherein the natural frequency of the resulting spring mass system formed by said container and said means for resiliently restraining couples the motion of said table to the fluid, the suspended particles, the granular substance and said polarization control means within said container on start up.

15. The apparatus of claim 12 wherein said orbital drive means further comprises a general horizontal crossbar mounting said polarization means and freely rotatable within said container, a weight freely movable radially along said crossbar, and resilient means urging said weight toward the axis of said rotation.

16. The apparatus of claim 12 wherein said orbital drive means further comprises an impeller mounted within said container to translate the momentum of the fluid entering the container at said inlet into a mechanical motion coupled to and rotating said polarization control means.

17. A process for removing a product from a fluid carrying the product and suspended particles, comprising the steps of:
providing a container,
introducing a supply of a granular substance into said container which selectively binds the product to remove it from said fluid,
introducing said fluid and suspended particles into a container holding said granular substance,
mixing said suspended particles and said granular substance by circulating the fluid, product, suspended particles and granular substance within said container,
filtering the fluid and suspended particles from the granular substance by using a filter mounted within said container,
depolarizing the filter during said mixing,
introducing an elution buffer into said container after said mixing has continued for a sufficient period of time to bind most of the product to said granular substance,
and draining the elution buffer and the product carried in the elution buffer from the container.

18. The process of claim 17 wherein said mixing includes driving said container in an orbital motion and inertially coupling said orbital motion of said container to a freely rotatable member mounted within said container and wherein said depolarizing includes spacing said member closely from an upstream side of said filter.

19. The process of claim 18 wherein said granular substance is a gel and the product is a protein produced by mammalian cells and wherein said spacing is in the range of 0.05 inch to 0.25 inch.

20. The process of claims 18 or 19 wherein said member is a blade.

21. The process of claim 18 wherein said orbital motion has a fixed radius and further comprising the step of tilting said container to kick start the rotation of said freely rotatable member.

22. The process of claim 18 wherein said orbital motion has a fixed radius and further comprising the step of introducing a void volume in said container to assist said inertial coupling.

23. The process of claim 17 further comprising the steps of stopping said mixing and settling said granular substance into a packed bed prior to said introducing of the elution buffer.

* * * * *